Feb. 11, 1958 E. A. RAGLAND ET AL 2,823,345
DIRECTION-SENSITIVE BINARY CODE POSITION CONTROL SYSTEM
Filed Oct. 16, 1953 3 Sheets-Sheet 3
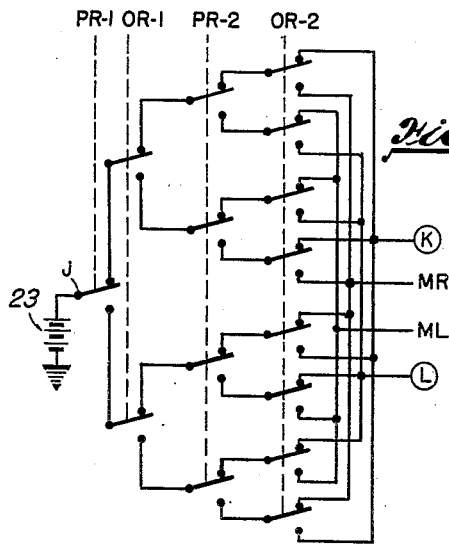
Fig.6
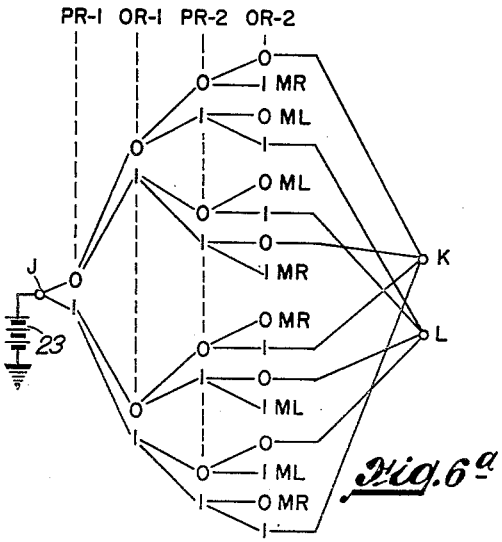
Fig.6ª
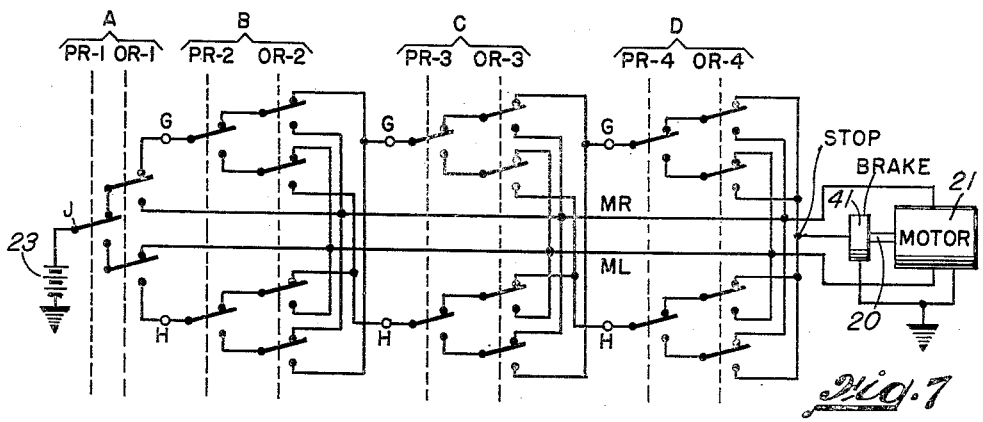
Fig.7
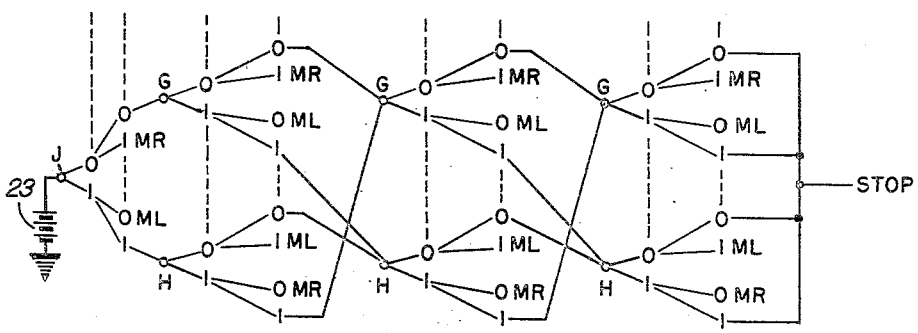
Fig.7ª
INVENTORS
H. B. Schultheis, Jr.
E. A. Ragland
BY
ATTORNEY

United States Patent Office 2,823,345
Patented Feb. 11, 1958

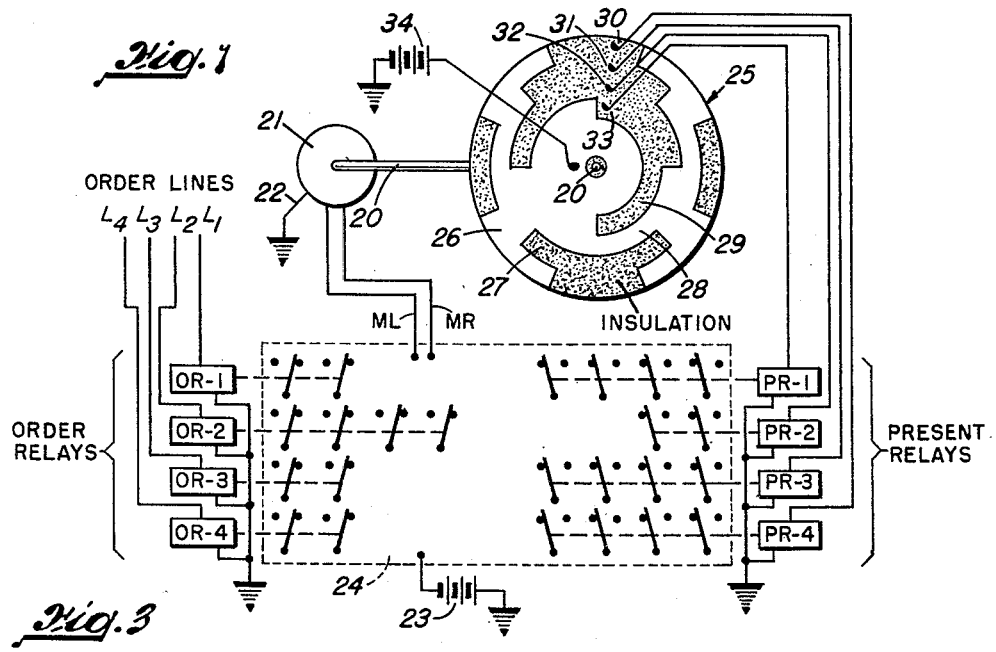
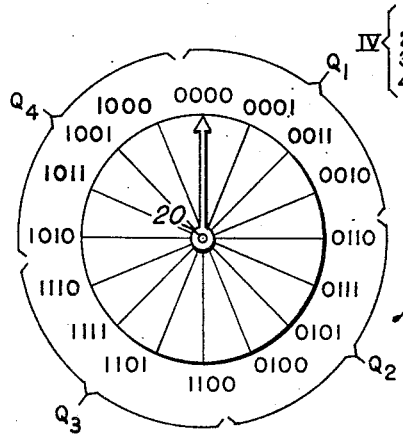

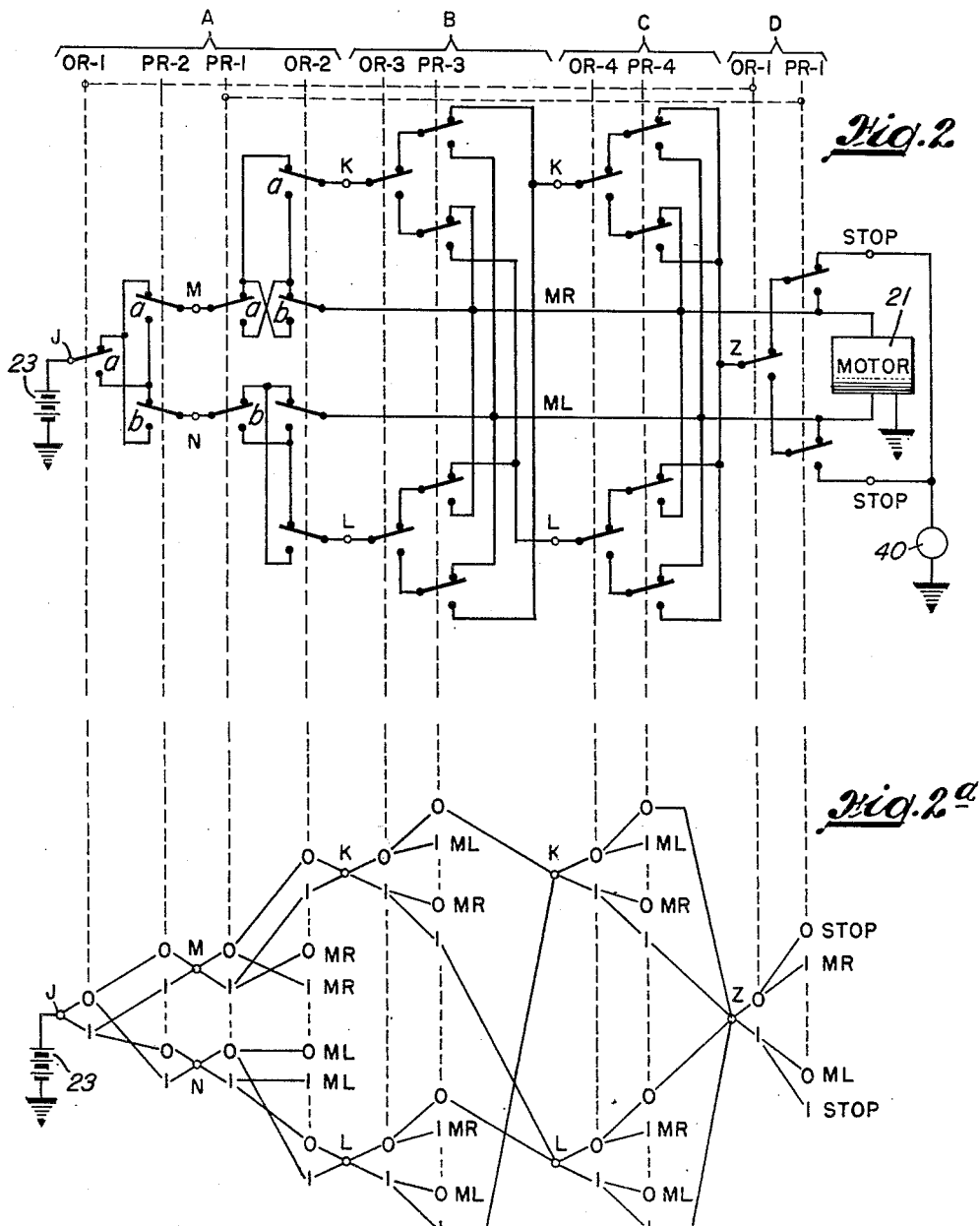

2,823,345

DIRECTION-SENSITIVE BINARY CODE POSITION CONTROL SYSTEM

Earl Albert Ragland, Van Nuys, and Harry B. Schultheis, Jr., Reseda, Calif., assignors to Bendix Aviation Corporation, North Hollywood, Calif., a corporation of Delaware Application October 16, 1953, Serial No. 386,524

7 Claims. (Cl. 318—467)

This invention relates to position control of a member movable in a path in either direction, by digital, reflected binary code signals. The movable member is usually but not necessarily, a rotatable shaft or the like.

A broad object of the invention is to provide a practicable system for accurately and reliably positioning a member by electrical signals.

Another object is to provide a position control system that is directly responsive to digital reflected binary code signals.

Another object is to provide a position control system directly responsive to digital reflected binary code signals that automatically moves a member that is movable through a closed (endless) path in direction to take the shorter path to the ordered (new) position.

Other more specific objects and features of the invention will appear from the description to follow.

Briefly, the present invention resides in a system that is directly responsive to digital reflected binary code "order" signals to move a controlled member directly into an ordered (new) position from the "present" (existing) position. Systems are presently known for moving a member always in the same direction into an ordered position, but such systems are unsuitable in many fields of use because: (1) there is a loss of time when the distance to the new position in the direction of movement is greater than the distance in the reverse direction, and (2) the initial movement may increase the distance between the present and ordered positions and produce confusion in the operation of the system.

In accordance with the present invention, direct movement is provided by a circuit capable of deriving directional sense from comparison of a digital reflected binary code corresponding to the order positioned with that of the present position, and selectively energizing a reversible motor in accordance therewith.

Reference is made to copending application of E. A. Ragland, Serial No. 383,863, filed October 2, 1953, and assigned to the assignee of the present application. The system of that application accomplishes the same end result in response to signals of the natural binary code that the present system accomplishes in response to signals of the reflected binary code.

A full understanding of the invention may be had from the following detailed description with reference to the drawing, in which:

Fig. 1 is a schematic diagram of a general system in accordance with the present invention.

Fig. 2 is a schematic diagram of a circuit used in that portion of the system represented by the dotted block 24' in Fig. 1.

Fig. 2a is an operational diagram explanatory of Fig. 2.

Fig. 3 is a conventional table showing a known 4-digit reflected binary code identifying sixteen different values or positions.

Fig. 4 is an explanatory diagram illustrating the use of the code in Fig. 3 in a rotary positioning system.

Fig. 5 is a chart showing the significance of the first and second digits in the diagram of Fig. 4.

Fig. 6 is a schematic diagram of an alternative circuit that can be employed in the first section of the circuit in Fig. 2.

Fig. 6a is an operational diagram explanatory of Fig. 6.

Fig. 7 is a schematic diagram of an alternative circuit substitutable for the circuit of Fig. 2 to give a different mode of operation.

Fig. 7a is an operational diagram explanatory of Fig. 7.

Referring to Fig. 1, there is shown a system for rotating a shaft 20 into any one of sixteen different positions in response to 4-digit reflected binary code signals. The shaft 20 is rotated from one position to another by a reversible electric motor 21 which has a common ground return connection 22 and two input busses ML and MR, respectively. Application of potential to the ML (motor left) bus causes the motor 21 to drive the shaft 20 counterclockwise, and application of potential to the MR (motor right) bus causes the motor 21 to rotate the shaft 20 clockwise.

For convenience, the directions of movement are termed right (clockwise) and left (counterclockwise). It will be noted from Fig. 4 that although in the reflected binary code each number is sometimes larger and sometimes smaller (in the sense that 0011 is a larger number than 0010, for instance) than another number on a given side thereof, in general, the numbers increase in clockwise direction and decrease in counterclockwise direction. Therefore, as used herein, right or clockwise means the direction of increasing numbers, regardless of whether that direction is actually clockwise (as it happens to be in the system shown) or counterclockwise.

The busses ML and MR are selectively energized by connecting one or the other to one terminal of a potential source 23, the other terminal of which is grounded. The connections are effected by selective operation of four order relays OR-1, OR-2, OR-3, OR-4, and four present relays PR-1, PR-2, PR-3, PR-4, each of which relays has either two or four transfer contacts, shown within the dotted block 24 in Fig. 1. The circuit whereby the contacts of the order and present relays connect source 23 to the ML and MR busses (sometimes referred to hereinafter as "circuit 24" is shown in Fig. 2 and will be explained later.

The present relays, PR-1 through PR-4, are energized in accordance with the position of the shaft 20 at any time by a coding disk 25. Thus, referring to Fig. 4, the circular arc of movement of the shaft 20 is divided into sixteen equally spaced angular positions, and the coding switch 25 selectively energizes the four present relays in accordance with the codes indicated for the different angular positions in Fig. 4. The coding switch 25 has four zones 26, 27, 28 and 29, each containing dead and live segments associated respectively with four brushes 30, 31, 32, 33, which are connected to the four present relays PR-1 to PR-4, inclusive. The live segments of the coding switch are connected to a source of potential 34, the other terminal of which is connected to the present relays through ground. It will be apparent that during rotation of the shaft 20 from one position to another the present relays will be energized and de-energized in accordance with the codes shown in Fig. 4.

The four order relays OR-1 to OR-4 are connected to separate order signal lines L-1 to L-4 over which ordered position code signals are received. The apparatus for transmitting these signals is not shown, but it will be understood that such a transmitter could comprise a transmitting shaft having a coding switch associated therewith similar to the coding switch 25.

The circuit 24 responds to the settings of the present and order relays to connect the potential source 23 to one or the other of the motor busses ML or MR whenever the condition of any present relay differs from the condition of the correspondingly numbered order relay, to drive the shaft 20 from its present position to the ordered position, and to de-energize the busses ML and MR whenever all of the present relays are in the same conditions as all of the corresponding numbered order relays. In other words, the overall function of the circuit 24 is to energize the motor 21 to move the shaft 20 in the direction of shorter path into a position in which the code corresponding to the position of the shaft 20 matches the ordered code, and then causing it to stop in that position.

The present system uses a known binary code variously termed "the reflected binary code," the "minimum error code," the "Gray code" and the "cyclic permutation code."

The essential characteristic of such a code, as will be apparent from inspection of Fig. 3, is that a change from any code number to the next adjacent code number involves a change in only one digit. It is recognized that a code of this nature is much less subject to errors originating in the electrical circuits than is a binary code in which two or more digits change values simultaneously.

It will be noted that in Fig. 3 the last (rightmost) digit is the least significant since it changes most often, the second digit from the right is the next least significant digit and so on, each digit reversing half as often as does the next digit to the right. However, the present invention is not dependent on the order of arrangement from left to right of the digits of different significance. For convenience, the most significant digit will be hereinafter referred to as the first digit, the next most significant digit as the second digit, etc., with the understanding that the terminology relates to the relative significance of the different digits and not necessarily to their horizontal positions in the code table.

An important feature of the present invention is that it provides a system using the reflected binary code which has directional sense, so that the controlled member 20 is automatically always moved in the direction of the shorter path to its ordered position.

Referring to Fig. 4, it will be observed that when the code of Fig. 3 is applied to a circle, the first digit in all positions in the first and second quadrants $Q_1$ and $Q_2$ is "0," and the first digit in all positions in the third and fourth quadrants $Q_3$ and $Q_4$ is "1." It will be apparent, therefore, that since the shorter path from any point in the semi-circle defined by quadrants $Q_1$ and $Q_2$ to any point in the other half of the circle containing quadrants $Q_3$ and $Q_4$ is sometimes clockwise and sometimes counter-clockwise, the first digit alone cannot provide directional sense.

However, it will be noted that the first two digits in any quadrant are different from those in any other quadrant. Therefore, the first two digits give some directional sense. For example, if the present shaft position is in quadrant $Q_1$ and the ordered position is in quadrant $Q_4$, the shorter path is in counterclockwise direction, and if the ordered position is in $Q_2$, the shorter path is in clockwise direction. On the other hand, if the ordered position is either in the same quadrant $Q_1$ or the opposite quadrant $Q_3$, the shorter path may be either clockwise or counterclockwise.

It will be noted also that in one-half of each quadrant the third digit is different from that in the other half, and this provides additional directional sense. Thus if the present and ordered positions are both in quadrant $Q_1$, and the third digit of the present position is "0" and the third digit of the ordered position is "1," the shorter path is clockwise. On the other hand, if the third digits are the same, they cannot impart directional sense.

The fourth digits are alternately "0" and "1," so it will be obvious that if the present and ordered positions are in the same half of any quadrant the fourth digit gives directional sense.

When the present and ordered positions are in opposite quadrants the first digits are always opposite. Hence the first digits are sufficient to distinguish between present and ordered positions in the same quadrant and those in opposite quadrants.

Summarizing the foregoing analysis of Fig. 4:

The first two digits determine the quadrant of any code position.

The first digits alone distinguish between present and ordered code positions in the same quadrant and those in opposite quadrants.

The third digit distinguishes between present and ordered code positions in the same half of the same quadrant from those in different halves of the same quadrant.

The fourth digit distinguishes between the two positions in any half quadrant.

The following rules, derived from analysis of Fig. 4, are utilized in constructing the selecting circuit 24 of Fig. 1:

I. When the first digit of the present position mismatches the second digit of the ordered position and the second digit of the present position matches the first digit of the ordered position, the ordered position is in the adjacent next higher quadrant with respect to the present position, and the direction of shorter path is to the right (clockwise). There are four possible combinations of the first two digits of the present and ordered codes satisfying this rule, and they are identified as conditions I-1 through I-4 in Fig. 5.

II. When the first digit of the present position matches the second digit of the ordered position and the second digit of the present position mismatches the first digit of the ordered position, the ordered position is in the adjacent next lower quadrant with respect to the present position, and the direction of shorter path is to the left (counter-clockwise). Again there are four combinations of the first two digits of the present and ordered codes satisfying this requirement and identified in Fig. 5 as conditions II-1 to II-4.

III. When the first digit of the present position matches the second digit of the ordered position and the second digit of the present position matches the first digit of the ordered position, the present and ordered positions are either both in the same quadrant or in opposite quadrants, and the direction of shorter path is uncertain. Again there are four possible combinations satisfying this rule, identified in Fig. 5 as III-1 through III-4. Under condition III-1 both positions are in the first quadrant. Under condition III-2 the present position is in the second quadrant, and the ordered position is in the fourth quadrant. Under conditions III-3 the present position and the ordered position are both in the third quadrant. Under condition III-4 the present position is in the fourth quadrant, and the ordered position is in the second quadrant.

IV. When the first digit of the present position mismatches the second digit of the ordered position and the second digit of the present position mismatches the first digit of the ordered position, the two positions are again either both in the same quadrant or in opposite quadrants, and the direction of shorter path is uncertain. In this instance, referring to Fig. 5, under condition VI-1 the present position is in the first quadrant, and the ordered position is in the third quadrant. Under conditions IV-2 the present and ordered positions are both in the second quadrant. Under condition IV-3 the present position is in the third quadrant, and the ordered position is in the first quadrant. Under condition IV-4 both the present and ordered positions are in the fourth quadrant.

It will be noted that under condition I and condition II the direction of shorter path is indicated by the first two digits alone until the present position moves out of the adjacent quadrant into the same quadrant as the ordered position, whereupon condition III-1 or III-3 or condition IV-2 or IV-4 exists.

Whenever condition III-1, III-3, IV-2 or IV-4 exists, the digits following the first and second digits provide the necessary directional information to cause movement to completion in a manner to be described later. Whenever condition III–2, III–4, IV–1 or IV–3 exists, the present and ordered positions may be diametrically opposite, in which case the rightward and leftward paths are of equal length, and it is immaterial which is taken. If the two positions are not diametrically opposite, the shorter path is determined by comparison of the third and fourth digits. Thus if the positions are diametrically opposite, the third and fourth digits match. This will be apparent from inspection of Fig. 4. If the present and ordered positions are in opposite quadrants but are not diametrically opposite, their third and/or fourth digits will mismatch, and the nature of the mismatch provides the necessary directional information to cause movement in the direction of shorter path.

Referring now to Fig. 2, the contacts of the respective relays OR–1 to OR–4 and PR–1 to PR–4 are identified by vertical dotted lines labeled at their upper ends with the corresponding relay designation. To simplify the circuit as much as possible, some of the contacts of the relay OR–1 and of the relay PR–1 are widely separated in Fig. 2, and the separate vertical lines extending through different contacts of the same relay bear the same relay identification symbol.

To facilitate explanation, different sections of the circuit in Fig. 2 are identified by the reference letters A, B, C and D, respectively (from left to right). Section A contains only contacts of the first and second digit relays PR–1, PR–2, OR–1, OR–2. Section B contains only contacts of the third digit relays PR–3, OR–3. Section C contains only contacts of the last digit relays PR–4, OR–4. Section D contains only contacts of the first digit relays PR–1, OR–1.

Section A has a single input terminal J. Each section has two output connections to the motor busses MR and ML busses respectively. Each intermediate section B and C has first and second input terminals K and L, and each section except the last two sections has two output connections to the input terminals K and L respectively of the following section. The last section D has one input terminal Z, and the next to the last section has an output connection thereto.

In Fig. 2 the movable contact of each set of transfer contacts OR–1, PR–2, etc., is shown in the position it assumes when its corresponding digit is "0." Hence the circuit is in the condition of rest when both the present and ordered position numbers are "0000." When any digit is "1" the associated movable contacts are in position opposite that shown.

The circuit is composed of a plurality of pairs of contact sets, each of which pairs compares a digit of the present code with a digit of the ordered code and completes a current path depending upon a match or mismatch between the compared digits.

Thus contacts OR–1a and PR–2a constitute a pair completing a circuit from source 23 to terminal M in section A when the first order digit matches the second present digit; contacts OR–1a and PR–2b constitute a pair completing a circuit to terminal N when the first order digit mismatches the second present digit; contacts PR–1a and OR–2b constitute a pair completing a circuit from terminal M to the MR bus when the first present digit mismatches the second ordered digit; and contacts PR–1a and OR–2a constitute a pair completing a circuit from terminal M to terminal K when the present first digit matches the ordered second digit.

The contact pairs in section A complete circuits regardless of the nature of the match or mismatch; thus to connect the terminal M to bus MR the present first digit may be "0" and the ordered second digit "1," or vice versa.

This is not the situation in sections B, C and D. Thus the first input terminal K of section B can be connected to the first input terminal K of section C only when the 3rd digits are both "0," to the MR bus only when the ordered digit is "1" and the present digit is "0," to the ML bus only when the ordered digit is "0" and the present digit is "1," and to the second input terminal L of section C only when both digits are "1."

The circuit is typical for codes of any number of digits exceeding three. Section A always contains the contacts of the first and second digit relays. Section C always contains contacts of the last digit relays. Section D always contains contacts of the first digit relays. A separate section B is provided for each digit between the second and the last digits. Increasing the number of digits merely increases the number of the sections B without otherwise altering the circuit.

The operation of the circuit of Fig. 2 is summarized in the diagram of Fig. 2a.

Fig. 2a is an operational diagram showing: the terminals energized by section A in response to each combination of the first two digits; the four possible combinations of the third digits, and the various connections made by section B in response thereto; the four possible combinations of the fourth digits and the various connections made by section C in response thereto; the four possible combinations of the first digits and the connections made by section D in response thereto.

It will be noted that section A must be capable of completing a circuit to either of the first and second terminals K and L of section B because, for example, when the third present and order digits are "0" and "1" respectively, the movement must be rightward under condition III, but leftward under condition IV. Likewise, section B must be capable of completing a circuit to either the first or second terminal of section C, because the same mismatch between the fourth digits must produce movement in one direction under condition III and in the opposite direction under condition IV.

Briefly, the function of section A is to compare in transposed relation the first and second digits of the present and order signals (i. e., compare the first and second digits, respectively, of the present code position with the second and first digits, respectively, of the ordered code position) to determine if the codes are in (1) the same or opposite quadrants or (2) in adjacent quadrants, and if so, the relative positions of the adjacent quadrants. In other words, section A determines which of the four conditions I, II, III, IV exists.

If condition I exists, section A applies battery to the motor bus MR to rotate the member 20 clockwise.

If condition II exists, section A applies battery to the motor bus ML to rotate the member 20 counterclockwise.

If condition III exists, section A energizes the first terminal K of section B, and if condition IV exists, section A energizes the second terminal L of section B.

Section B compares the third digits of the present and order codes and completes a circuit from its first input terminal K to the first input terminal K of section C if the third digits are both "0"; completes a circuit to the motor bus MR if the present third digit is "0" and the ordered third digit is "1"; completes a circuit to the motor bus ML if the present third digit is "1" and the ordered third digit is "0"; and completes a circuit to input terminal L of section C if both the present and ordered third digits are "1." It will be observed that section "B" is able to determine direction and complete the circuit to the motor only when the present and ordered third digits are different. In all other instances the direction is uncertain, and the circuit is completed to terminal K or L of section C to see if the last (fourth) digits can determine the direction.

If the last (fourth) present and ordered digits are different, the direction is determined, and terminal K of section C is connected to the motor bus MR if the present digit is "0" and the ordered digit is "1" and to the motor bus ML if the present digit is "1" and the ordered digit is "0." Section C also connects its input terminal L to the motor bus ML if the present digit is "0" and the ordered digit is "1," and to the bus MR if the present digit is "1" and the ordered digit is "0." In all instances where the present and ordered digits match, input terminals K and L of section C are connected to input terminal Z of section D.

Section D, as previously indicated, is responsive only to the first digits of the present and ordered codes. If these digits match, the present and ordered positions are in the same quadrant and are identical, and the circuits from terminal Z to the motor busses are opened. If the first digits mismatch, energization of terminal Z means that the present and ordered positions are diametrically opposite, under which condition both the clockwise and counterclockwise paths are equal, and the circuit may be completed to either the motor bus MR or ML. Section D provides that when the first present digit is "0" and the first ordered digit is "1," the ML bus is energized; and when the present digit is "1" and the ordered digit is "0" the bus MR is energized, but it is a matter of choice which bus is energized.

It will be noted from the foregoing and from inspection of Fig. 2a that if the present and ordered positions are in adjacent quadrants (conditions I and II), section A completes a circuit directly to the proper motor bus MR or ML to take the shorter path to the ordered position.

On the other hand, if the present and ordered positions are in quadrants $Q_2$ and $Q_4$, respectively (condition III–B or III–D), section A completes a circuit to the K input terminal of section B; and if the present and ordered positions are in the opposite quadrants $Q_1$ and $Q_3$ (condition IV–A or IV–C), section A completes a circuit to the L input terminal of section B.

Under conditions III and IV, when the third digits of the present and ordered codes are mismatched, they are capable of determining the direction of shorter path from the present to the ordered positions, and section B connects its input terminals K and L to the proper motor busses MR or ML. However, when the third digits are matched they cannot determine the direction, and section B connects its input terminal K to input terminal K of section C and connects its input terminal L to input terminal L of section C when the third digits are both "0," and connects its input terminal K to input terminal K of section C and connects its input terminal L to input terminal L of section C when the third digits are both "1."

Section C compares the fourth (last) digits of the present and order codes. When these digits are mismatched they are capable of determining the direction of shorter path in those cases undetermined by section B, and section C connects its input terminal K to the MR bus and its input terminal L to the MR bus when the present third digit is "1," and the ordered third digit is "0."

It will be noted that under condition III–2 or III–4 when the present and ordered positions are in opposite quadrants, it is only when the third digits match and the fourth digits match that terminal Z is energized. This situation exists only when the present and ordered positions are either diametrically opposite or the same. If the positions are the same, then the desired movement has been completed and the motor is de-energized. If the positions are diametrically opposite, section D energizes the motor arbitrarily in one direction or the other to start moving the present position out of diametrically opposite relation to the ordered position. This immediately changes the value of the third or fourth digit of the present code so that the sections B and C of the circuit become active to continue the movement until the next adjacent quadrant is reached, whereupon section A becomes active to complete the movement into the same quadrant as the ordered position, whereupon sections B and C again function to complete the movement into the ordered position, and section D opens the motor circuit. In this connection, it will be observed that no one of sections A, B and C can complete a circuit direct to a motor bus when all the digits of the present code match all the digits of the ordered code, as is the situation when the desired movement has been completed.

An important advantage of the invention is that the circuit does not become disproportionately complex as the number of digits increases. For each additional digit it is merely necessary to add another intermediate section identical with section B. The number of contacts on each relay remains the same. On the other hand, each additional digit in the codes doubles the number of positions and the accuracy of adjustment. Five digits provide 32 positions; six digits provide 64 positions; and nine digits provide 512 positions, enabling positive angular positioning to substantially less than 1°. Fig. 2 shows a preferred circuit in accordance with the invention. It appears to be the simplest and most practicable circuit for performing the required functions. However an alternative circuit that can be substituted for the first section (section A) of Fig. 2 is shown in Fig. 6 and its operation explained in Fig. 6a. The circuit of Fig. 6 is generally less desirable than the corresponding first section of Fig. 2 because it requires fifteen sets of transfer contacts as compared to nine in Fig. 2, and requires eight sets of contacts on a single relay (OR–2) as compared to four sets in Fig. 2. However, the circuit of Fig. 6 is fully operative.

The circuits heretofore discussed are adapted for use with a member movable in a closed or endless path and have the important advantage of moving the member in the direction of shorter path from the present to the ordered position.

However, there are situations in which the movable member has an open-ended path and can move in only one direction from the present to the ordered position. This is generally the case with linear and arcuate indicators and is sometimes the case with full circle indicators. Thus, referring to Fig. 4, it may be desirable in some instances to always rotate the hand or indicator to the right (clockwise) when moving from a lower to a higher number, and to the left when moving from a higher to a lower number, even though this involves taking a longer path. Such movement can be produced with the circuit of Fig. 7, the operation of which is shown in Fig. 7a.

Whereas in Fig. 2 the first digits alone can never determine the direction of shorter path, they can determine the direction of movement to a higher or lower number when the first digits mismatch. Hence, the first section (section A) of Fig. 7 compares the first present and order digits PR–1 and OR–2 and performs the following operations, as indicated in Fig. 7a:

It energizes the first terminal G of section B when both digits are "0"; it energizes the second terminal H when both digits are "1"; it energizes the MR bus when the present digit is "0" and the order digit is "1"; and it energizes the ML bus when the present digit is "1" and the order digit is "0."

It will be observed from Figs. 3 and 4 that if the first digit of a position number is "0," the number is in the lower value half of the path, and if it is "1," the number is in the higher value half of the path. Hence, if the first present and order digits mismatch in the sense "0" "1," the direction of movement is determined and is to the right in Fig. 4 and down in the linear scale of Fig. 3. On the other hand, if the first digits mismatch in the sense "1" "0" the movement is to the left in Fig. 4 and up in the linear scale of Fig. 3.

Of course, if the first digits of the present and ordered positions match, the direction is indeterminate, and connection is made to the second section (section B) of Fig. 7 to see if the second digits can determine the direction.

It will be observed from Fig. 3 that if the first digits of the present and ordered positions are both "0" but the second digit is "0" and the second ordered digit is "1," the movement must be down, whereas if the first digits of both the present and ordered positions are "1," the second present digit is "0," and the second ordered digit is "1," the movement must be up. This situation is taken care of in Fig. 7, because section B of the circuit connects its input terminal G to the MR bus in response to the present and order digits "0," "1," respectively, but connects its input terminal H to the ML bus in response to the same digits.

In analyzing Fig. 7 with reference to Fig. 3, it is to be understood that rightward movement resulting from energization of the MR bus in Fig. 7 is analagous to downward movement in Fig. 3, and leftward movement resulting from energization of the ML bus in Fig. 7 is the equivalent of upward movement in Fig. 3.

In Fig. 7, all sections following section A are identical, each section responding to a mismatch between its associated present and order digits to complete a connection from its input terminals to either the MR or the ML bus, and responding to matched "0" digits to connect its input terminal G to the input terminal G of the next section, and its input terminal H to the input terminal H of the next section, and responding to matched "1" digits to connect its input terminal G to the H terminal of the next section and connect its H input terminal to the G input terminal of the next section.

Whereas the circuit of Fig. 2 determines the direction of shorter distance between two positions arranged in a closed or endless path, the circuit of Fig. 7 has as a primary function the comparison of the present and ordered numbers for determining which is the higher of the two (or if the two numbers are the same) since the direction of movement is always rightward or down when moving to a higher number, and always leftward or up when moving to a lower number. Thus, the circuit of Fig. 7, instead of being employed to drive a motor in one direction or the other, could be employed to energize an indicator that would merely indicate whether the ordered number is higher or lower than the present number, or equal to the present number.

It will also be apparent that, since in Fig. 7 the motor rotates a distance proportional to the difference in value between the present and ordered numbers, measurement of the movement of the motor will give the difference between the present and ordered numbers.

It will be apparent from the foregoing description that in both Fig. 2 and Fig. 7 the output terminals of the last section labeled "Stop" are energized only when the desired movement has been completed, and the present position becomes the same as the ordered position. These "Stop" terminals may be utilized to energize any desired device, such as an indicator lamp 40 in Fig. 2, or a brake 41 in Fig. 7 to effect rapid and positive stopping of the shaft 20 at the completion of its movement. Alternatively, the stop terminal and the switch contacts connected thereto may be omitted if no operation is to be performed in response to completion of the movement.

Although for the purpose of explaining the invention a particular embodiment thereof has been shown and described, obvious modifications will occur to a person skilled in the art, and I do not desire to be limited to the exact details shown and described.

We claim:

1. In a digital control system: a controlled member movable in either direction from any position in a closed path through a plurality of positions corresponding to successive multidigit reflected binary code members; a reversible motor coupled to said member having first and second busses and responsive to potential on its first bus to move said member in direction of increasing numbers and responsive to potential on its second bus to move said member in direction of decreasing numbers; means responsive to movement of said member for developing present binary code signals corresponding to the position number of said member at any instant; means for receiving order binary code signals corresponding to the numbers of ordered positions of said member; and selective energizing means directly responsive to different present and order signals for energizing that one of said first and second busses to move said member in the direction of that one of the two paths between the present and the order positions which is at least as short as the other path.

2. Apparatus according to claim 1 in which said energizing means comprises: a plurality of tandem-connected digit-comparing circuit sections, each section responsive to corresponding digits of both the present and order signals, including a first section responsive to the first two digits, a plurality of intermediate sections successively associated with and responsive to successive single digits following the second digit, each intermediate section having first and second input terminals connected to the preceding section, and a last section responsive to the first digits and having an input terminal connected to the last intermediate section; said first section comprising means for energizing said first bus in response to an order signal in the next higher quadrant from the present signal, energizing said second bus in response to an order signal in the next lower quadrant from the present signal, energizing the first input terminal in the first intermediate section in response to present and order signals in the same odd quadrant or in opposite even quadrants, and energizing said second input terminal in the first intermediate section in response to present and order signals in the same even quadrant or in opposite odd quadrants; each intermediate section except the last comprising means responsive to its associated present digit and order digit for connecting its first input terminal to said first bus in response to a "1" order digit and a "0" present digit, to said second bus in response to a "0" order digit and a "1" present digit, to the first input terminal of the next section when the digits are both "0" and to the second input terminal of the next section when the digits are both "1," and comprising means for connecting its second input terminal to said second bus in response to a "1" order digit and a "0" present digit, to said first bus in response to a "0" order digit and a "1" present digit, to the second input terminal of the next section when the digits are both "0," and to the first input terminal of the next section when the digits are both "1"; said last intermediate section comprising means for connecting its first input terminal to said first bus in response to a "1" order digit and a "0" present digit, to said second bus in response to a "0" order digit and a "1" present digit, and to said input terminal of said last section when the order and present digits match, and means for connecting its second input terminal to said second bus in response to a "1" order digit and a "0" present digit, to said first bus in response to a "0" order digit and a "1" present digit, and to said input terminal of the last section when the order and present digits match; said last section comprising means for connecting its input terminal to one of said busses in response to a mismatch between the first digits of the order and present signals.

3. Apparatus according to claim 1 in which said energizing means comprises: a plurality of tandem-connected digit-comparing circuit sections each responsive to corresponding digits of both the present and order signals, including a first section responsive to the first two digits, a plurality of intermediate sections successively associated with and responsive to successive single digits following the second digit, each intermediate section having first and second input terminals connected to the preceding section, and a last section having an input terminal connected to the last intermediate section; said first section including means for comparing in transposed relation the first and second digits of the present and order signals and energizing said first bus when the first and second present digits respectively mismatch and match their compared digits, energizing said second bus when the first and second present digits respectively match and mismatch their compared digits, energizing said second section first input terminal when both present digits match their compared digits, and energizing said second section second input terminal when both present digits mismatch their compared digits; each intermediate section except the last containing means for comparing its associated present and order digits and connecting its first input terminal to the first input terminal of the next section when both digits are "0," to said first bus when the present and order digits are "0," "1," respectively, to said second bus when said present and order digits are "1" "0" respectively, and to said second input terminal of the next succeeding section when both said digits are "1" connecting its second input terminal to the second input terminal of the next section when both said digits are "0," to the second bus when the present and order digits are "0" "1" respectively, to the first bus when they are "1" "0" respectively, and to the first input terminal of the next section when both said digits are "1"; said last intermediate section containing means for comparing its associated present and order digits and connecting its first input terminal to the input terminal of the last section when said digits match, to said first bus when they are "0" "1," respectively and to said second bus when they are "1" "0," respectively, connecting its second input terminal to said input terminal of the last section when said digits match, to said second bus when they are "0" "1" respectively, and to said first bus when they are "1" "0," respectively; and said last section containing means completing a circuit from its input terminal to one of said second or first busses when said first present digit mismatches the first order digit.

4. Apparatus according to claim 3 in which said means in said first section comprises: internal terminals M and N; an energizing source; means for comparing the first order digit with the second present digit and connecting said source to said M terminal when said digits match and to said N terminal when said digits mismatch; means for comparing the first present digit with the second order digit and connecting said M terminal to said first terminal of the first intermediate section when said digits match, and to said first bus when they mismatch; and means for comparing the first present digit with the second order digit and connecting said N terminal to said second bus when said digits match, and to said second terminal of the first intermediate section when they mismatch.

5. Apparatus according to claim 1 in which said energizing means comprises: a plurality of tandem-connected digit-comparing circuit sections, each responsive to corresponding digits of both the present and order signals, including a first section responsive to the first two digits, a plurality of intermediate sections successively associated with and responsive to successive single digits following the second digits, each intermediate section having first and second input terminals connected to the preceding section, and a last section having an input terminal connected to the last intermediate section; said first section including a first subsection and a second subsection and first, second, third and fourth lines connecting the first subsection to the second subsection, said first subsection containing switching means responsive to the first present and order digits for comparing them and energizing said first line when both are "0," energizing said second line when the present and order digits are "0" "1" respectively, energizing said third line when the present and order digits are "1" "0" respectively, and energizing said fourth line when both digits are "1," said second subsection containing switching means jointly responsive to the second present and order digits and being responsive to "0" present and order digits to connect said first line to the first terminal of the second section, connect said second line to said second bus, connect said third line to said first bus, and connect said fourth line to the second terminal of the second section, said second subsection being responsive to a "0" present digit and a "1" order digit to connect said first line to the first bus, connect said second line to the second terminal of the second section, connect said third line to the first terminal of the second section, and connect said fourth line to the second bus, said second subsection being responsive to a "1" present digit and a "0" order digit to connect said first line to the second bus, connect said second line to the first terminal of the second section, connect said third line to the first terminal of the second section, and connect said fourth line to the first bus, and said second subsection being responsive to "1" present and order digits to connect said first line to the second terminal of the second section, connect said second line to the first bus, connect said third line to the second bus, and connect said fourth line to the first terminal of the second section; each intermediate section except the last containing means for comparing its associated present and order digits and connecting its first input terminal to the first input terminal of the next section when both digits are "0," to said first bus when the present and order digits are "0" "1" respectively, to said second bus when said present and order digits are "1" "0" respectively, and to said second input terminal of the next succeeding section when both said digits are "1," connecting its second input terminal to the second input terminal of the next section when both digits are "0," to the second bus when the present and order digits are "0" "1" respectively, to the first bus when they are "1" "0" respectively, and to the first input terminal of the next section when both said digits are "1"; said last intermediate section containing means for comparing its associated present and order digits and connecting its first input terminal to the input terminal of the last section when said digits match, to said first bus when they are "0" "1" respectively, and to said second bus when they are "1" "0" respectively, connecting its second input terminal to said input terminal of the last section when said digits match, to said second bus when they are "0" "1" respectively, and to said first bus when they are "1" "0" respectively; and said last section containing means completing a circuit from its input terminal to one of said second or first busses when said first present digit mismatches the first order digit.

6. Apparatus for determining the relative values of first and second multidigit reflected binary code signals comprising: a plurality of tandem arranged circuit sections, each associated with a corresponding digit of each of said two signals and successive sections being associated with successive digits in order of decreasing significance; first and second busses common to all said sections; said first section having an input line and first and second output lines and circuit means responsive to the two associated signal digits for connecting said input line to said first bus when said digits mismatch in one sense, to said second bus when they mismatch in the other sense, to said first output line when both digits are "0" and to said second output line when both digits are "1"; a plurality of sections following said first section, each having first and second input and first and second output lines connected respectively to the first and second output and first and second input lines of the adjoining sections and having circuit means responsive to the two associated signal digits for connecting its first input line to said first bus and its second input line to said second bus when said digits mismatch in said one sense, connecting its first input line to said second bus and its second input line to said first bus when said digits mismatch in said other sense, connecting its first input line to its first output line and its second input line to its second output line when both digits are "0," and connecting its first input line to its second output line and its second input line to its first output line when both digits are "1."

7. In apparatus for determining the relative values of corresponding digits of first and second multidigit reflected binary code signals; successive tandem arranged circuit sections associated respectively with successive digits of said numbers in order of decreasing significance; first and second busses common to said sections; each of said sections having first and second input and first and second output lines connected respectively to the first and second output and input lines of the adjoining sections and having circuit means responsive to the two associated digits for connecting its first input line to said first bus and its second input line to said second bus when said digits mismatch in said one sense, connecting its first input line to said second bus and its second input line to said first bus when said digits mismatch in said other sense, connecting its first input line to its first output line and its second input line to its second ouput line with both digits are "0," and connecting its first input line to its second output line and its second input line to its first output line when both digits are "1."

References Cited in the file of this patent

UNITED STATES PATENTS

| | | |
|---|---|---|
| 2,575,342 | Gridley | Nov. 20, 1951 |
| 2,590,110 | Lippel | Mar. 25, 1952 |
| 2,630,552 | Johnson | Mar. 3, 1953 |
| 2,630,562 | Johnson | Mar. 3, 1953 |

FOREIGN PATENTS

| | | |
|---|---|---|
| 716,649 | Germany | Jan. 26, 1942 |
| 714,740 | Great Britain | Sept. 1, 1954 |